United States Patent [19]

Schuetz et al.

[11] Patent Number: 5,536,694
[45] Date of Patent: Jul. 16, 1996

[54] CATALYST PRECURSOR FOR AN ACTIVATED RANEY METAL FIXED-BED CATALYST, AN ACTIVATED RANEY METAL FIXED-BED CATALYST AND A PROCESS FOR ITS PREPARATION AND USE, AND A METHOD OF HYDROGENATING ORGANIC COMPOUNDS USING SAID CATALYST

[75] Inventors: Peter Schuetz, Linsengericht; Roland Burmeister, Geiselbach, both of Germany; Bertrand Despeyroux, Fourgueux, France; Hans Moesinger; Helmfried Krause, both of Rodenbach, Germany; Klaus Deller, Hainburg, Germany

[73] Assignee: Degussa Aktiengesellschaft, Frankfurt, Germany

[21] Appl. No.: 322,290

[22] Filed: Oct. 13, 1994

[30] Foreign Application Priority Data

Oct. 16, 1993 [DE] Germany .................... 43 35 360.6

[51] Int. Cl.⁶ .................................................. B01J 25/00
[52] U.S. Cl. .......................... 502/301; 502/325; 502/331; 502/332; 502/335; 502/336
[58] Field of Search .................................. 502/301, 325, 502/331, 332, 335, 336

[56] References Cited

U.S. PATENT DOCUMENTS

| | | | |
|---|---|---|---|
| 2,928,891 | 3/1960 | Justi et al. .................. | 136/86 |
| 3,351,495 | 11/1967 | Larsen ........................ | 136/146 |
| 3,404,551 | 10/1968 | Spisak ........................ | 72/16 |
| 3,558,365 | 1/1971 | Duddy et al. .............. | 136/120 |
| 3,573,038 | 3/1971 | Jung et al. ................. | 75/211 |
| 3,781,227 | 12/1973 | Vladimirovich ........... | 252/466 |
| 3,821,305 | 6/1974 | Bartalini .................... | 260/583 |
| 4,153,578 | 5/1979 | De Thomas et al. ..... | 252/438 |
| 4,826,799 | 5/1989 | Cheng et al. .............. | 502/301 |

FOREIGN PATENT DOCUMENTS

| | | |
|---|---|---|
| 0091027 | 10/1983 | European Pat. Off. . |
| 2139774 | 8/1971 | Germany .................... B01J 11/06 |
| 2100373 | 9/1972 | Germany . |
| 2101856 | 10/1973 | Germany . |
| 2053799 | 6/1974 | Germany . |
| 2829901 | 1/1980 | Germany . |
| 50-99987 | 8/1975 | Japan . |

OTHER PUBLICATIONS

Database WPI, Section Ch, Week 7704, Derwent Publications, AN 77–06665Y and JP–A–51 143 585 Dec. 10, 1976.
I. Nakabajasi (Katal. Reakts. Zhidk, Faze 280–3 from: Ref. Zh., Khim. 1973, Abstr. No. 6B1100 (Russ) 1972) month unknown.

Primary Examiner—Shrive Beck
Assistant Examiner—Timothy H. Meeks
Attorney, Agent, or Firm—Beveridge, DeGrandi, Weilacher & Young

[57] ABSTRACT

Shaped, activated Raney metal fixed-bed catalysts are obtained by molding a powder of at least one catalyst alloy, comprising at least one Raney process metal as catalytically active component and a leachable alloy component, and a powder of pure Raney process metal as binder with the addition of a shaping aid and pore-producer and subsequent calcination at temperatures below 850° C. During calcination the shaping aid and pore-producer are burned away. Catalyst alloy powder and binder powder thereby sinter together to give a mechanically stable and porous molded item. This molded item thus consists of particles of catalyst alloys which are bonded by the powder of pure Raney process metal. It has no catalytically inactive, ceramic or glassy binder. The surface layer of the molded item is activated by leaching the leachable alloy component contained in the catalyst alloys with caustic soda solution.

42 Claims, No Drawings

CATALYST PRECURSOR FOR AN ACTIVATED RANEY METAL FIXED-BED CATALYST, AN ACTIVATED RANEY METAL FIXED-BED CATALYST AND A PROCESS FOR ITS PREPARATION AND USE, AND A METHOD OF HYDROGENATING ORGANIC COMPOUNDS USING SAID CATALYST

INTRODUCTION AND BACKGROUND

The present invention relates to a catalyst precursor for an activated Raney metal fixed-bed catalyst and a shaped and activated Raney metal fixed-bed catalyst. In another aspect, the present invention relates to a process for preparing a shaped and activated Raney metal fixed-bed catalyst by preparing a mixture of powders of at least one catalyst alloy and at least one binder with the addition of moistening agents and auxiliary agents such as shaping aids, lubricants, plasticizers and/or pore-producers, homogenizing and shaping this mixture to give the desired molded item, calcining the molded item and activating the catalyst precursor obtained in this way by partially or completely leaching the leachable alloying component and subsequently washing the final catalyst. The catalyst alloys each contain at least one catalytically active catalyst metal and one alloying component leachable in alkali. Furthermore, the present invention relates to the use of such a shaped and activated Raney metal fixed-bed catalyst and a method of hydrogenating organic compounds using such catalysts.

Activated metal catalysts are known as Raney catalysts in the chemical engineering field. They are used mainly in the powdered form in a large number of reactions for hydrogenating organic compounds. These powdered catalysts are prepared from an alloy of a catalytically active metal (also called a catalyst metal or Raney process metal) and another alloying component which is leachable in alkalis. The Raney process metals used are mainly nickel, cobalt, copper or iron, but also other metals such as palladium and silver may be used. The alloying component which is mainly used is aluminum, but other components can be used, in particular zinc and silicon are also suitable.

This so-called Raney alloy is first finely milled according to Raney's method. Then the aluminum is completely or partially removed by leaching with alkalis such as, for example, caustic soda solution. This process activates the alloyed powder. Due to leaching of the aluminum, it has a high specific surface area between 20 and 100 $m^2/g$ and is rich in absorbed hydrogen. The activated catalyst powder is pyrophoric and is stored under water or organic solvents or is embedded in high-boiling organic compounds.

Powder catalysts have the disadvantage that they can only be used in batch processes and have to be isolated after the catalytic reaction by time-consuming filtration of the reaction media. Various processes for preparing molded items have therefore been disclosed which lead to activated metal fixed-bed catalysts after extraction of the aluminum. Thus, for example, coarse particulate, i.e. only coarsely milled, Raney alloys are available which can be activated by treatment with caustic soda solution. In this case, leaching and activation of the particulate take place only in a shallow surface layer whose thickness can be set by means of the extraction conditions.

The major disadvantage of catalysts prepared using this method is the poor mechanical stability of the relatively thin activated outer layer. Since only this outer layer of the catalyst is also catalytically active, this results in rapid deactivation which at best can be partially reversed by renewed activation of deeper-lying alloyed layers using caustic soda solution.

U.S. Pat. No. 4,826,799 describes the preparation of activated Raney metal fixed-bed catalysts by mixing a powder of the alloy of Raney process metal and aluminum with an organic polymer and optionally a shaping aid, shaping this mixture by extrusion or compression to give the desired molded items, and calcining the molded items in air at temperatures above 850° C. This leads to a pore structure in the molded item, due to combustion of the organic additives, and to the formation of α-aluminum oxide which acts as a ceramic binder between the alloyed particles and gives the desired mechanical stability to the molded items. Then follows activation of the molded item by leaching of the remaining aluminum which was not oxidized during calcination.

The critical feature of this known process is the formation of α-aluminum oxide between the alloyed particles as a ceramic binder. α-Aluminum oxide, in contrast to γ-aluminum oxide and aluminum itself, is not leachable in alkalis and is therefore not dissolved out when activating the molded item with caustic soda solution. An advance, as compared with fixed-bed catalysts in the form of coarse particled alloys, is the formation of a pore system by burning out the organic auxiliary agent. The pore system in the final catalyst enables educt molecules to diffuse into the catalyst and product molecules to diffuse out of the catalyst.

However, catalysts prepared in accordance with U.S. Pat. No. 4,826,799 also have serious disadvantages. In order to form α-aluminum oxide, the molded item has to be calcined at temperatures higher than 850° C. In fact, below 850° C. no α-aluminum oxide is formed at all, only γ-aluminum oxide which is soluble in alkalis. The high calcination temperature leads to high energy consumption. The α-aluminum oxide used as binder is catalytically inactive and thus reduces catalyst activity. During calcination, a more or less sealed layer of this inactive material which is insoluble in alkalis is formed on the surface of the alloyed particles. This means activation of the alloy is difficult. In the final catalyst, this layer represents a barrier to diffusion of the educt molecules, which results in a further loss of activity.

The ability to be easily recycled is required of modern catalyst systems in order to protect the environment. However, processing ceramically bonded metal fixed-bed catalysts is difficult due to the insoluble ceramic binder.

I. Nakabajasi (Katal. Reakts. Zhidk, Faze 280–3 from: Ref. Zh., Khim. 1973, Abstr. No. 6B1100 (Russ) 1972) describes bonding powdered catalyst alloys with powdered alkali- and acid-resistant glass frits which melt at high temperature. After the calcination procedure, aluminum is dissolved out of the catalyst precursor as usual by leaching with alkalis. In this case, the sintered glass frit particles between the alloy particles are responsible for the mechanical stability of the catalyst. When adding a small proportion of glass powder there is the risk, during leaching, that the molded item might be dissolved. However, when adding high proportions of glass powder, alloy particles embedded in the sintered glass matrix can no longer be activated. Here then is a bulky barrier to diffusion, similar to the one described above. In addition, the temperatures required to sinter the glass frit component are always higher than 850° C.

The use of low-melting glass frits (that is with a melting point below 850° C.) is not possible because this type of glass frit is generally not chemically stable towards alkalis and thus is dissolved out in the activation step.

Japanese Patent JP 500 99987 describes a process for preparing metal fixed-bed catalysts based on nickel, cobalt or copper catalysts. In this case, the actual nickel, cobalt or copper catalyst is first mixed with up to 30 wt. % of a powdered metal/aluminum alloy. This mixture is then shaped to give appropriate molded items and is treated with steam at elevated temperature. This produces $\gamma$-$Al_2O_3$ which acts as a binder in these catalysts. However, analogous application of this process to the preparation of activated Raney metal fixed-bed catalysts is not possible, as already mentioned, because at the latest during the activation procedure with caustic soda solution, without which a Raney catalyst cannot be prepared, the $\gamma$-$Al_2O_3$ binder would be dissolved out. The process presented in Patent JP 500 99987 is thus not suitable for preparing shaped and activated Raney metal catalysts.

SUMMARY OF THE INVENTION

An object of the present invention is to provide shaped, activated Raney metal fixed-bed catalysts which avoid the disadvantages described above, such as high energy consumption during calcination, reduction of catalyst activity by catalytically inactive binders which inhibit diffusion, and poor reprocessability of the spent catalysts. The invention also provides a method for preparing the shaped catalysts.

Shaped, activated Raney metal fixed-bed catalyst are obtainable by preparing a mixture of powders of at least one catalyst alloy and at least one binder with the addition of moistening agents and optional additives such as shaping aids, lubricants, plasticizers and/or pore-producers, homogenizing and shaping this mixture to give the desired molded item, calcining the molded item and activating the catalyst precursor obtained in this way by partially or completely leaching the leachable alloying component, and subsequently washing the final catalyst. The catalyst alloys each contain at least one catalytically active Raney process metal (e.g., nickel, cobalt, copper or iron, and also other metals such as palladium and silver) and a leachable alloying component and optionally promoters. A feature of the catalyst of the present invention resides in that one or more pure Raney process metals are used as the binder and that calcination of the molded item is performed at temperatures below 850° C.

Another object of the present invention is a method of using such a shaped, activated Raney metal fixed-bed catalyst by contacting the catalyst with organic compounds to form hydrogenated organic compounds.

Yet another object of the present invention is a method of hydrogenating organic compounds by contacting the catalyst with an organic compound (e.g., nitrobenzene) to form a hydrogenated organic compound (e.g., aniline).

DETAILED DESCRIPTION OF THE INVENTION

Preferred Raney process metals are nickel, cobalt, copper or iron and the leachable alloying components used are aluminum, zinc or silicon. These are generally leached in alkali such as NaOH. The ratio by weight of Raney process metal to leachable alloying component in the catalyst alloy is in the range from 30:70 to 70:30, as is usual with Raney alloys. The Raney process metal used as binder, in a real practical application, does not have to be the same as the catalyst metal present in the catalyst alloy. Rather, the possibility is opened up of combining different Raney process metals with each other, in the catalyst alloy and as binder, offering a further important degree of freedom when adjusting the catalytic properties to the particular catalytic process. Thus the binder used in the present invention can be nickel, cobalt, copper and iron. Generally any of the metals used for making Raney metal catalysts are suitable. The binder metal is used in an unalloyed and unadulterated form.

Catalyst alloy and binder are processed in the form of powders, typically with the addition of moistening agents and optionally with the addition of conventional additives such as shaping aids, lubricants, plasticizers, and optionally pore-producers to give a moldable material. Any materials conventionally used for these purposes may be used as the shaping aid, lubricant, plasticizer and pore-producer. A number of suitable materials for this purpose are mentioned in the following U.S. Pat. Nos. (all of which are incorporated by references in their entirety): 4,826,799; 3,404,551; and 3,351,495. Waxes such as, for example wax C micropowder PM from Hoechst AG, greases such as magnesium or aluminum stearates, or polymers which contain carbohydrates such as tylose (methylcellulose) are preferably used for the above purposes.

The solids in the mixture are carefully homogenized in suitable conventional mixers or kneaders with the addition of a moistening agent. Water, alcohols, glycols, polyether glycols or mixtures thereof are suitable as moistening agents as is well known in the art.

The primary particle size ranges of the powders of catalyst alloy and binder used are essentially unchanged during homogenization. That is, no milling takes place.

The purpose of this preliminary treatment with the moistening agent and additives is to prepare the mixture for the subsequent shaping process. Extrusion, pelleting and compression may be used for example for the shaping process employing conventional equipment known for such purposes.

The type and sequence of incorporation of additives depends on the shaping process to be used. Extrusion requires a plastic material with a specific viscosity, whereas a material which is free-flowing and which can be readily metered out is required for pelleting. The techniques to be used for this purpose, such as, for example, agglomeration to produce a free-flowing powder or adjustment to the correct viscosity for extrusion, are known as a matter of routine to the person skilled in the art. It is only important that the primary particle size ranges of the catalyst powder and binder powder are essentially unchanged by the preliminary treatment.

Any shapes which are conventional in the catalyst field are suitable as molded items. Spheres, rings, spoked rings or pellets may be produced, depending on the requirements of the particular application.

The final molded items are optionally dried to constant weight at temperatures between 80° and 120° C. and then calcined at temperatures below 850° C. preferably between 500° and 700° C., in air in continuous or batch operated kilns such as rotary kilns or stationary kilns. The organic additives then burn off and leave behind a corresponding pore system.

The pore structure and pore volume of the catalysts can be varied over a wide range by suitable selection of the pore-producing additives. The final pore structure which is developed and the pore volume are also affected by the particle sizes of the powders of catalyst alloy and binder employed.

The structure of the molded item can be adapted to the requirements for the particular catalytic process by appropriate selection of the parameters mentioned.

During calcination of the molded items, the catalyst alloy powder and binder powder sinter together and provide the molded items with high mechanical stability and good resistance to abrasion. Typically, the hardness of cylindrical pellets after calcination is between 200 and 300 N (measured radially in accordance with ASTM D 4179–82).

After calcination the molded items are activated by leaching the aluminum using caustic soda solution. A 20% strength sodium hydroxide solution warmed to 80° C. can be used for this purpose. In this case, treatment for 2 hours leads to an active outer layer with a thickness of about 0.1 to 1 mm. Surprisingly, it has been shown that the hardness is actually slightly increased by leaching, in the case of pellets to values of more than 300 N.

These properties are closely connected with the pure Raney process metal used as binder which is not dissolved out during leaching and thus in the sintered product forms stable bonds between the individual alloyed particles. In contrast, sintering the catalyst alloy powder without adding the metal binder leads to molded items which partially disintegrate or "decompose" during leaching and in which the activated layer has only a low resistance to abrasion.

The fixed-bed catalyst according to the present invention thus consists of powder particles of the catalyst alloy which are bonded by sintering with a powder (i.e., the binder) of the Raney process metal itself. It contains no catalytically inactive binder at all, unlike the fixed-bed catalysts known from the prior art.

The catalyst metals used as binder contribute to the catalytic activity. Restricting the temperature of calcination to values below 850° C. prevents the formation of α-aluminum oxide as shown by X-ray diffraction analysis of the calcined material. Any γ-aluminum oxide which is formed is dissolved out of the catalyst structure when activating the catalyst with caustic soda solution.

The lack of α-aluminum oxide in the catalyst becomes clearly noticeable on activation. Whereas catalysts according to the present invention can be activated under quite mild conditions (20% NaOH, 80° C.) within only 2 hours, the temperature of the alkaline solution has to be raised and the activation time extended when activating catalysts bonded with α-aluminum oxide (according to U.S. Pat. No. 4,826,799) in order to obtain an active outer layer of the same thickness.

To prepare the catalyst according to the present invention, the average particle sizes of the catalyst alloy powder and of the binder, and also the ratio by weight of catalyst alloy powder to binder, can be varied over a wide range. Since the binder does also contribute to the catalytic activity, but it cannot be activated by extracting aluminum, its possible contribution to the catalytic activity is limited. Therefore its proportion in the catalyst should be kept as small as possible.

Ratios by weight of catalyst alloy powder to binder in the range 100:20 to 100:0.5 have proven to be useful. It has also been shown that the particle size of the binder should be smaller than the particle size of the catalyst alloy powder. Particles of binder can then be regarded as small bridges between the larger alloyed particles. It was found that the hardness of the final catalyst structure increased within certain limits with decreasing particle size of the binder.

Reasonable activity values are obtained when the powder of the catalyst alloy has an average particle size between 10 and 500 μm.

Catalysts according to the present invention may also be doped with other metals in order to influence their catalytic properties. The purpose of this type of doping is, for example, to improve the selectivity in a specific reaction. The doping metals are often also called promoters. Doping and promoting Raney catalysts are described, for example, in U.S. Pat. No. 4,153,578, DE-AS 21 01 856, DE-OS 21 00 373 (U.S. Pat. No. 3,781,227) and DE-AS 20 53 799 (U.S. Pat. No. 3,821,305); all of said U.S. Patents are incorporated by reference in their entirety. Suitable promoters are chromium, iron, cobalt, tantalum, titanium and/or molybdenum and also metals from the platinum group. They are expediently added as alloy components in the catalyst alloy. Their proportion in the catalyst alloy is typically up to 15 wt. %.

In the case of doping with molybdenum, it is expedient to carry out doping only after activating the catalyst. For this, the final catalyst is introduced into a molybdate solution (e.g.,alkali or alkaline-earth or ammonium molybdate solutions, especially sodium molybdate) at elevated temperature, e.g. generally at 60° to 100° C. (especially at 80° C.). A specific amount of the molybdenum compound is adsorbed by the catalyst, depending on the duration of treatment, e.g. up to 15% by weight.

Although the present invention enables metal fixed-bed catalysts to be prepared using parameters which can be varied over a wide range, and thus enables adaptation to the particular requirements of the application, the following Table gives ranges of parameters for preferred embodiments:

TABLE 1

Typical ranges of parameters for preferred metal fixed-bed catalysts in pellet form (Ø 3 mm; length 5.2 mm).

|  | before activation | after activation |
|---|---|---|
| thickness of activated layer [mm] | — | 0.05–1 |
| BET surface area [m²/g] according to DIN 66132 | <1 | 1–30 |
| Pore volume [ml/g] as water absorption capacity | — | 0.03–0.06 |
| Hardness [N] according to ASTM D 4179-82 (radial) | 200–300 | >300 |
| Catalyst metal [wt. %] | 56–62 | 62–70 |
| Aluminum [wt. %] | 38–44 | 30–38 |
| α-Al₂O₃ [wt. %] | — | — |
| γ-Al₂O₃ [wt. %] | — | — |

Due to the preparation method the pore volume of the activated catalysts consists mainly of macropores which normally are measured by mercury intrusion. In the case of Raney metal catalysts, mercury intrusion is not applicable since amalgams would be formed. Therefore, the pore volume was measured as the water capacity of the catalysts after deactivation with hydrogenperoxide.

The BET surface areas in Table 1 are the specific surface areas of the final catalyst molded items determined by means of nitrogen adsorption isotherms using Brunauer, Emmett and Teller's method. Essentially only the 0.05 to 1 mm thick activated outer layer of the pellets contributes to the BET surface area. The surface areas quoted, however, are with respect to the total mass of the pellets which also includes the mass of the non-activated part, i.e. the sub-surface core of the pellets.

The catalyst precursors resulting after calcination are also of great importance in the economic utilization of the invention. They are not pyrophoric and can therefore be handled and transported without difficulty. Activation can be carried out by the user shortly before use. The catalyst precursors do not need to be stored under water or organic solvents or embedded in organic compounds.

In contrast to the final catalysts, the catalyst precursors are materials with a homogeneous composition of an intimate mixture of catalyst particles of catalyst alloy and of the Raney process metal acting as binder which are sintered to give a mechanically stable and porous molded item. Its density is between 1.3 and 5.5 g/cm$^3$, depending on the composition of the catalyst alloy and depending on the pore volume. The pore volumes are advantageously up to 0.05 cm$^3$/g. Since the catalyst precursors have still not been activated, their specific surface areas are less than 1 m$^2$/g. The ratio by weight of total Raney process metals present (from the catalyst alloy and the binder) to leachable alloy component is between 30:70 and 75:25.

More than 99 wt. % of the catalyst precursors consist of catalyst alloy and the Raney process metal acting as binder. When calcining the precursors at temperatures below 850° C., negligible amounts of surface oxides are produced. However, these are removed during activation with alkaline solutions and therefore have no effect on the subsequent catalytic properties.

Various catalysts according to the present invention were prepared and compared with comparison catalysts from the prior art with regard to their catalytic activity in the hydrogenation of nitrobenzene to give aniline.

The following starting materials were used:

| Catalyst alloy powder (Raney process metal and leachable component): | |
|---|---|
| Ni/Al alloy 53/47 (ratio by weight of nickel/aluminum) volume specific mean particle diameter: | $d_{50}$ = 65 μm |
| Cu/Al alloy 50/50; | $d_{50}$ = 54 μm |
| Co/Al alloy 50/50; | $d_{50}$ = 60 μm |
| Fe/Al alloy 50/50; | $d_{50}$ = 57 μm |
| Doped catalyst alloy powder: | |
| Ni/Cr/Fe/Al alloy 47.4/1.5/1.1/50; | $d_{50}$ = 57 μm |
| Ni/Ta/Al alloy 49/1/50; | $d_{50}$ = 65 μm |
| Ni/Co/Al alloy 45/5/50; | $d_{50}$ = 65 μm |
| Ni/Ti/Al alloy 48/2/50; | $d_{50}$ = 65 μm |
| Molybdenum solution for later doping: | |
| 4.2% strength Na molybdate solution | |
| Binder (pure Raney process metal): | |
| Ni powder (>99% Nickel); | $d_{50}$ = 21 μm |
| Cu powder; | $d_{50}$ = 23 μm |
| Co powder; | $d_{50}$ = 20 μm |
| Fe powder; | $d_{50}$ = 8 μm |
| NiO powder; | $d_{50}$ = 21 μm |
| Additives | |
| Wax powder (ethylene-bis-stearoylamide) Ø = 15 μm as pore-producer | |
| Aerosil (pyrogenic silica) | |
| Moistening agent: water | |

A readily free-flowing, pelletable catalyst mixture was produced each time from catalyst alloy, binder and additives. To do this, first a mixture of catalyst alloy and binder was carefully homogenized in a mixer, with the addition of water, and after an intermediate drying stage was mixed with the wax powder and optionally silica.

The following Tables 2 to 4 contain data on the composition of the catalyst mixtures before pelleting (Table 2), on the conditions of calcination (Table 3), and on the conditions of activation (Table 4). The examples according to the present invention are labelled "E" and the comparison examples "CE".

Pellets with a diameter of 3 mm and a length of 5.2 mm were pressed from the catalyst mixtures given in Table 2.

The pellets were activated in 20% strength caustic soda solution at 80° C. after calcination.

TABLE 2

| Composition of catalyst mixtures before molding | | | |
|---|---|---|---|
| No. | Catalyst Alloy 1000 g each time | Binder | Additives |
| E1 | Ni/Al | 150 g Ni | 25 g wax powder |
| E2 | Cu/Al | 150 g Cu | 25 g wax powder |
| E3 | Co/Al | 150 g Co | 25 g wax powder |
| E4 | Fe/Al | 150 g Fe | 25 g wax powder |
| E5 | Ni/Al | 150 g Ni | 25 g wax powder |
| E6 | Ni/Al | 100 g Ni | 25 g wax powder |
| E7 | Ni/Al | 50 g Fe | 25 g wax powder |
| E8 | Ni/Al | 70 g Ni + 70 g Fe | 25 g wax powder |
| E9 | Ni/Cr/Fe/Al | 150 g Ni | 25 g wax powder |
| E10 | Ni/Ta/Al | 150 g Ni | 25 g wax powder |
| E11 | Ni/Co/Al | 150 g Ni | 25 g wax powder |
| E12 | Ni/Ti/Al | 150 g Ni | 25 g wax powder |
| E13 | Ni/Al | 150 g Ni | 25 g wax powder |
| CE1 | Ni/Al | 150 g NiO | 25 g wax powder |
| CE2 | Ni/Al | | 50 g wax powder + 50 g Aerosil |
| CE3 | Ni/Al | | 25 g wax powder |

The catalyst mixtures in examples E1 to E6 produced activated metal fixed-bed catalysts in which the Raney process metal used as binder was identical to the catalytically active metal in the catalyst alloy. Catalyst mixture E5 is identical to that in E1. The molded items from example E5, however, were activated for twice as long (see Table 4) in order to produce a thicker activated outer layer.

In examples E7 and E8 catalysts were prepared in which the metal used as binder differed from the catalytically active metal in the alloy. In example E8, in fact, two different metal powders were used as binder.

E9 to E12 are catalyst mixtures in which the catalyst alloy was also doped with Cr, Fe, Ta, Co or Ti. Catalysts were prepared from the catalyst mixture in E13 which were doped with molybdenum after activation by means of a 90 minute treatment with a 4.2% strength sodium molybdate solution at 80° C.

In comparison example CE1 an oxidic material (NiO) was used as binder.

No binder was added to the material in CE3. Rather, α-aluminum oxide was formed as a ceramic binder by calcination at 900° C.

TABLE 3

| Conditions of calcination | | | |
|---|---|---|---|
| No. | Temperature [°C.] | Time [min] | Hardness after calcination [N] |
| E1 | 700 | 120 | 280 |
| E2 | 500 | 360 | >300 |
| E3 | 700 | 120 | 236 |
| E4 | 700 | 120 | 300 |
| E5 | 700 | 120 | 280 |
| E6 | 800 | 120 | >320 |
| E7 | 700 | 120 | >300 |
| E8 | 700 | 120 | 300 |
| E9 | 700 | 120 | >300 |
| E10 | 700 | 120 | 300 |
| E11 | 700 | 120 | >300 |
| E12 | 700 | 120 | >300 |

TABLE 3-continued

Conditions of calcination

| No. | Temperature [°C.] | Time [min] | Hardness after calcination [N] |
|---|---|---|---|
| E13 | 700 | 120 | 280 |
| CE1 | 700 | 120 | 25 |
| CE2 | 700 | 120 | 18 |
| CE3 | 900 | 120 | >300 |

TABLE 4

Activation in 20% strength caustic soda solution

| No. | Temperature [°C.] | Time [min] | Thickness of layer [mm] | activation [N] | Hardness after |
|---|---|---|---|---|---|
| E1 | 80 | 120 | 0.3 | >300 | |
| E2 | 80 | 120 | 0.3 | >300 | |
| E3 | 80 | 120 | 0.3 | >300 | |
| E4 | 80 | 120 | 0.2 | >300 | |
| E5 | 80 | 240 | 0.45 | >300 | |
| E6 | 80 | 120 | 0.3 | >300 | |
| E7 | 80 | 120 | 0.3 | >300 | |
| E8 | 80 | 120 | 0.3 | >300 | |
| E9 | 80 | 120 | 0.3 | >300 | |
| E10 | 80 | 120 | 0.3 | >300 | |
| E11 | 80 | 120 | 0.3 | >300 | |
| E12 | 80 | 120 | 0.3 | >300 | |
| E13 | 80 | 120 | 0.3 | >300 | |
| CE1 | 80 | 120 | Layer not abrasion resistant | | |
| CE2 | 80 | 120 | Pellets decomposed | | |
| CE3 | 100 | 240 | 0.3 | >300 | |

Comparison examples CE1 and CE2 did not produce catalysts which could be used after activation. The molded items from CE1 were not abrasion resistant and the molded items from CE2 decomposed during activation.

The molded items from comparison example CE3 were very difficult to activate. In order to obtain a layer of at least comparable thickness as the catalysts according to the present invention, the temperature of the alkaline solution had to be raised to 100° C. and the activation time had to be doubled. This behavior is due to the passivating effect of the ceramic binder α-aluminum oxide formed in situ as a binder at high calcination temperatures.

All the catalysts were washed several times with water after activation and stored under water except for the catalysts from example E4. Water was removed from the catalysts from E4 by washing twice with isopropanol and decanting the liquor and stored under isopropanol in order to prevent the catalyst rusting. The bulk density of all the catalysts in the moist state was about 2 kg/l.

EXAMPLE 14

The catalysts from examples 1, 3, 7, 9 to 12 and from comparison example CE3 were compared with each other with respect to their catalytic activity in the hydrogenation of nitrobenzene. For this, 250 g of nitrobenzene and 250 g of ethanol were initially introduced into a stirred autoclave with a blower-stirrer and a capacity of 1 liter. In each case, 20 g of the catalyst being tested were suspended in a catalyst basket in such a way that the educt/solvent mixture could flow all round the catalyst molded items and hydrogen gas could be passed over it. Hydrogenation was performed under a hydrogen pressure of 40 bar and at a temperature of 150° C. After 2, 4 and 5 hours reaction time respectively, samples were withdrawn and analyzed using gas chromatography. The results are given in Table 5.

TABLE 5

Hydrogenation of nitrobenzene to give aniline

| | Conversion to aniline after | | |
|---|---|---|---|
| No. | 2 h | 4 h | 5 h |
| E1 | 17.3% | 40.2% | 46.2% |
| E3 | 16.4% | 32.2% | 47.8% |
| E7 | 14.0% | 50.0% | 59.0% |
| E9 | 24.0% | 57.0% | 77.5% |
| E10 | 18.3% | 46.2% | 58.0% |
| E11 | 26.4% | 58.6% | 71.5% |
| E12 | 21.0% | 47.0% | 58.5% |
| CE3 | 0.9% | 3.2% | 4.0% |

The results in Table 5 show that the catalysts according to the present invention have an unexpectedly greatly increased activity in the hydrogenation of nitrobenzene to give aniline as compared with the comparison catalyst. The low activity of the comparison example is presumably due to the inert ceramic binder α-aluminum oxide which has a negative effect on the catalytic activity, over and above its actual proportion by weight, by forming a barrier to diffusion of the educt molecules. In contrast, the catalysts bonded with catalytically active metals in accordance with the present invention contain no inert material.

The present invention thus provides technology with activated Raney metal fixed-bed catalysts which are unexpectedly distinguished by high catalytic activity, high hardness, good resistance to abrasion, relatively low temperatures for calcination and activation, good reprocessability, and which can therefore be used to advantage for the hydrogenation of organic compounds in a fixed-bed. Areas of use which may be given by way of example are the hydrogenation of nitro groups, the hydrogenation of C—C double bonds, the hydrogenation of sugars, and the hydrogenation of aromatic rings.

Further variations and modifications of the foregoing will be apparent to those skilled in the art and such variations and modifications are attended to be encompassed by the claims that are appended hereto.

German Priority Application P 43 35 360.6, filed on Oct. 16, 1993, is relied on and incorporated by reference.

What is claimed:

1. A process for preparing a shaped Raney metal fixed-bed catalyst, said process consisting essentially of preparing a mixture of powders consisting essentially of at least one catalyst alloy and at least one binder, and a moistening agent, and optionally an additive selected from the group consisting of a shaping aid, lubricant, plasticizer, poreproducer, and mixtures thereof, wherein said catalyst alloy consists essentially of at least one Raney process metal as catalytically active component, a leachable alloy component and optionally a promoter, wherein said binder consists essentially of at least one Raney process metal, homogenizing said mixture, shaping said mixture to give a molded catalyst precursor which still is not activated, calcining said molded catalyst precursor at a temperature below 850° C. to obtain a sintered catalyst precursor, and activating said sintered catalyst precursor by leaching said leachable alloy component with alkali until the leached and thereby activated outer layer has a thickness of 0.05 to 1 mm; optionally subsequently washing the final catalyst; optionally doping said catalyst with molybdenum as a promoter after said activating by introducing said catalyst into a molybdate solution at elevated temperature; and optionally drying said catalyst at a temperature from 80° to 120° C. prior to said calcining.

2. The process according to claim 1, wherein said activated outerlayer has a thickness of 0.1 to 0.5 mm.

3. The process according to claim 1, wherein said Raney process metal in said catalyst alloy is at least one catalytically active metal selected from the group consisting of nickel, cobalt, copper, iron and mixtures thereof.

4. The process according to claim 1, wherein said leachable alloy component is selected from the group consisting of aluminum, zinc, silicon, and mixtures thereof.

5. The process according to claim 4, wherein said leachable alloy component is aluminum.

6. The process according to claim 1, wherein the ratio by weight of said Raney process metal in said catalyst alloy to said leachable alloy component is 30:70 to 70:30.

7. The process according to claim 1, wherein said binder is selected from the group consisting of nickel, cobalt, copper, iron and mixtures thereof.

8. The process according to claim 1, wherein the ratio by weight of said catalyst alloy to said binder is 100:20 to 100:0.5.

9. The process according to claim 1, wherein the particles of said powdered catalyst alloy have an average particle size between 10 and 500 μm and the average particle size of said binder is less than that of said catalyst alloy.

10. The process according to claim 1, wherein said promoter in the catalyst alloy is selected from the group consisting of chromium, iron, cobalt, tantalum, titanium, and mixtures thereof.

11. The process according to claim 1, wherein said promoter in the catalyst alloy is present at up to 15 wt. % with reference to the weight of said catalyst alloy.

12. The process according to claim 1, wherein said shaped catalyst has a density of 1.3 to 5.5 g/cm$^3$ prior to said activating.

13. The process according to claim 1, wherein said shaped catalyst has a pore volume of 0.01 to 0.05 cm$^3$/g prior to said activating.

14. The process according to claim 1, wherein said calcining is conducted at a temperature from 500° to 700° C.

15. The process according to claim 1, wherein said moistening agent is selected from the group consisting of water, alcohol, polyether glycol and mixtures thereof.

16. The process according to claim 1, wherein said activating consists essentially of leaching with 20% NaOH at 80° C. for approximately 2 hours.

17. The process according to claim 1, wherein the ratio by weight of total Raney process metals from said catalyst alloy and said binder to said leachable alloy component is 30:70 to 75:25.

18. The process according to claim 1, wherein the primary particle size ranges of said powders is essentially unchanged during said homogenizing.

19. The process according to claim 1, wherein said calcined molded catalyst precursor has a hardness of 200 to 300 N.

20. The process according to claim 1, wherein said calcined molded catalyst precursor does not contain α-aluminum oxide.

21. The process according to claim 1, wherein said final catalyst does not contain γ-aluminum oxide.

22. The process according to claim 1, wherein said calcined molded catalyst precursor is not pyrophoric.

23. The process according to claim 1, wherein said catalyst precursors consist of more than 99 wt. % of catalyst alloy and binder.

24. A shaped, activated Raney metal fixed-bed catalyst, said catalyst produced by a method consisting essentially of preparing a mixture of powders consisting essentially of at least one catalyst alloy and at least one binder, and a moistening agent, and optionally an additive selected from the group consisting of a shaping aid, lubricant, plasticizer, pore-producer, and mixtures thereof, wherein said catalyst alloy consists essentially of at least one Raney process metal as catalytically active catalyst metal, a leachable alloy component and optionally a promoter, wherein said binder consists essentially of at least one pure Raney process metal, homogenizing said mixture, shaping said mixture to give a molded catalyst precursor which still is not activated, calcining said molded catalyst precursor at a temperature below 850° C. to obtain a sintered catalyst precursor, and activating said sintered catalyst precursor by leaching said leachable alloy component with alkali until the leached and thereby activated outer layer has a thickness of 0.05 to 1 mm, and subsequently washing the final catalyst; optionally doping said catalyst with molybdenum as a promoter after said activating by introducing said catalyst into a molybdate solution at elevated temperature; and optionally drying said catalyst at a temperature from 80° to 120° C. prior to said calcining.

25. The shaped catalyst according to claim 24, wherein said Raney process metal in said catalyst alloy consists essentially at least one catalytically active metal selected from the group consisting of nickel, cobalt, copper, iron and mixtures thereof.

26. The shaped catalyst according to claim 24, wherein said leachable alloy component is selected from the group consisting of aluminum, zinc, silicon, and mixtures thereof.

27. The shaped catalyst according to claim 26, wherein said leachable alloy component is aluminum.

28. The shaped catalyst according to claim 24, wherein the ratio by weight of said Raney process metal in said catalyst alloy to said leachable alloy component is 30:70 to 70:30.

29. The shaped catalyst according to claim 24, wherein said binder is selected from the group consisting of nickel, cobalt, copper, iron and mixtures thereof.

30. The shaped catalyst according to claim 24, wherein the ratio by weight of said catalyst alloy to said binder is 100:20 to 100:0.5.

31. The shaped catalyst according to claim 24, wherein the particles of said powdered catalyst alloy have an average particle size between 10 and 500 μm and the average particle size of said binder is less than that of said catalyst alloy.

32. The shaped catalyst according to claim 24, wherein said promoter in the catalyst alloy is selected from the group consisting of chromium, iron, cobalt, tantalum, titanium, and mixtures thereof.

33. The shaped catalyst according to claim 24, wherein said promoter in the catalyst alloy is present at up to 15 wt. % with reference to the weight of said catalyst alloy.

34. The shaped catalyst according to claim 24, wherein the activated outer layer of said shaped catalyst has a thickness of 0.1 to 0.5 mm.

35. The shaped catalyst according to claim 24, wherein said shaped catalyst has a density of 1.3 to 5.5 g/cm$^3$ prior to said activating.

36. The shaped catalyst according to claim 24, wherein said shaped catalyst has a pore volume of 0.01 to 0.05 cm$^3$/g prior to said activating.

37. The shaped catalyst according to claim 24, wherein said calcined molded catalyst precursor has a hardness of greater than 300 N.

38. The shaped catalyst according to claim 24, wherein said calcined molded catalyst precursor does not contain α-aluminum oxide.

39. The shaped catalyst according to claim 24, wherein said final catalyst does not contain γ-aluminum oxide.

40. The shaped catalyst according to claim 24, wherein said calcined molded catalyst precursor is not pyrophoric.

41. The shaped catalyst according to claim 24, wherein said catalyst precursors consist of more than 99 wt. % of catalyst alloy and binder.

42. A catalyst precursor for an activated Raney metal fixed-bed catalyst, said catalyst precursor produced by a method consisting essentially of preparing a mixture of powders consisting essentially of at least one catalyst alloy and at least one binder, and a moistening agent, and optionally an additive selected from the group consisting of a shaping aid, lubricant, plasticizer, pore-producer, and mixtures thereof, wherein said catalyst alloy consists essentially of at least one Raney process metal as catalytically active component, a leachable alloy component and optionally a promoter, wherein said binder consisting essentially of at least one pure Raney process metal, homogenizing said mixture, shaping said mixture to give a molded catalyst precursor, calcining said molded catalyst precursor at a temperature below 850° C. to obtain a sintered catalyst precursor; wherein said molded catalyst precursor has a density of 13 to 5 5 g/cm$^3$, a pore volume of up to 0.05 cm$^3$/g and a BET surface area of less than 1 m$^2$/g.

* * * * *